United States Patent [19]

Belanger

[11] Patent Number: 4,969,286
[45] Date of Patent: Nov. 13, 1990

[54] FISHING ROD AND MEASURING DEVICE
[76] Inventor: Rheal Belanger, 636 Samson Ave., Riv. Beaudette P.Q., Canada, J0P 1R0
[21] Appl. No.: 406,026
[22] Filed: Sep. 11, 1989
[51] Int. Cl.⁵ ............................................. A01K 87/00
[52] U.S. Cl. ...................................................... 43/25
[58] Field of Search ........................... 43/18.1, 18.5, 25
[56] References Cited

U.S. PATENT DOCUMENTS

| 102,677 | 5/1870 | Gregory | 33/485 |
|---|---|---|---|
| 461,106 | 10/1891 | Oberly | 43/18.1 |
| 1,113,847 | 10/1914 | Turner | 43/18.1 |
| 1,255,269 | 2/1918 | Zinkiewiez | 43/18.1 |
| 2,507,056 | 5/1950 | Smith | 33/485 |
| 3,088,208 | 5/1963 | Mitchell | 33/485 |
| 3,522,657 | 8/1970 | Metrulis | 33/375 |
| 4,631,851 | 12/1986 | Whitehurst | 43/7 |

Primary Examiner—Richard K. Seidel
Assistant Examiner—James Miner
Attorney, Agent, or Firm—Leon Gilden

[57] ABSTRACT

A fishing rod includes a measuring device thereon. The measuring device may be integrally formed onto the surface of the fishing rod, or alternatively may use selectively adherable tape portions to indicate predetermined lengths along the fishing rod. Additionally, a self-adhering gauge bar is selectively securable to a surface of the fishing rod diametrically opposed to the eyelet guides of the fishing rod, and itself may include a telescoping abutment bar cooperative with an abutment bar formed at a terminal end of the fishing rod in alignment with the former abutment bar for measuring fish therebetween.

3 Claims, 5 Drawing Sheets

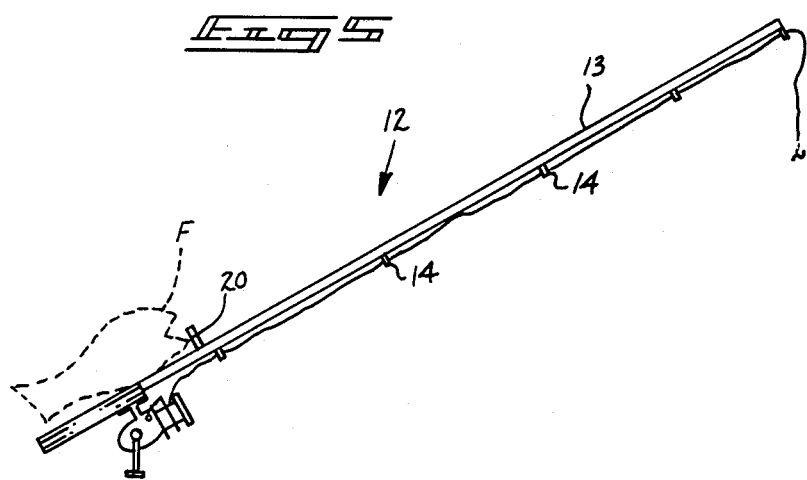
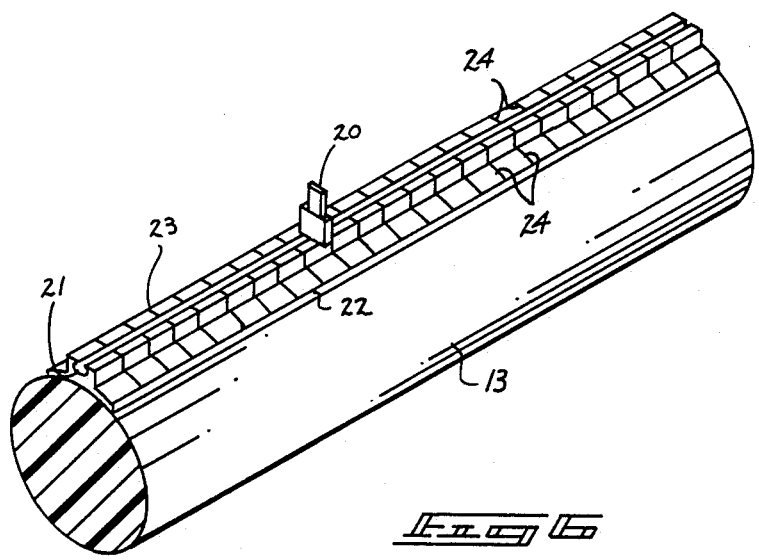

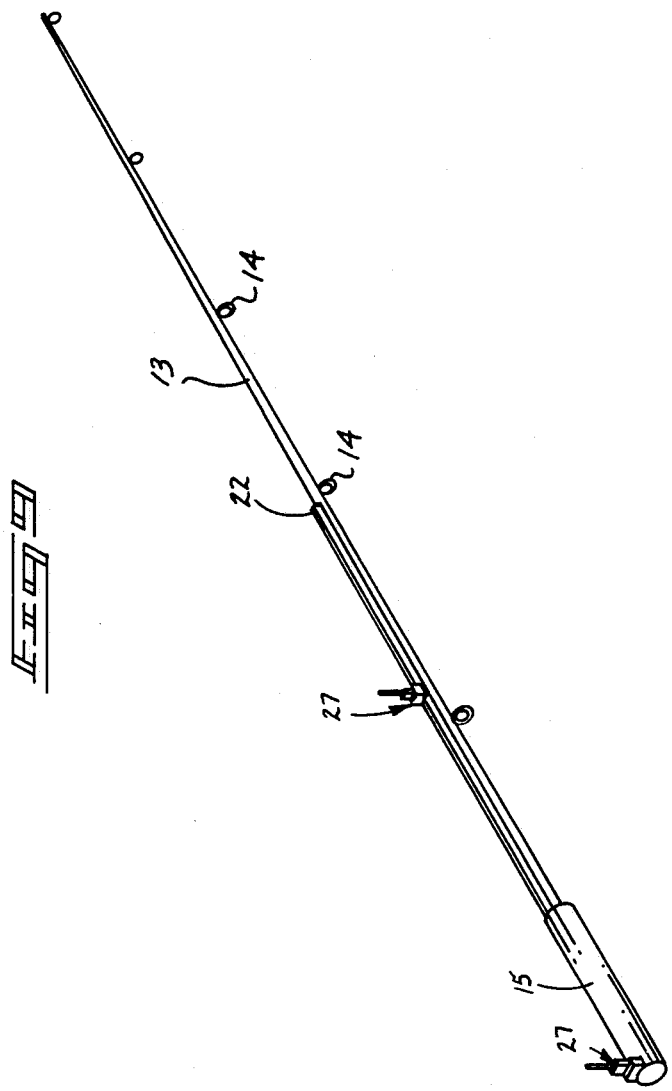

FISHING ROD AND MEASURING DEVICE

BACKGROUND OF THE INVENTION

1. Field of the Invention

The field of invention relates to fishing rods, and more particularly pertains to a new and improved fishing rod and measuring device wherein the same provides scale means upon a fishing rod for measuring of fish caught by an individual.

2. Description of the Prior Art

The use of fishing rods is known in the prior art where conventionally the fish so secured during a fishing procedure are frequently subject to a measurement determination for indication of a legal catch. Further, such information is of particular and general interest to fishermen acquiring the newly secured fish.

The prior art devices, while having provided various measuring indicating devices in conjunction therewith, have heretofore failed to provide a convenient and accommodating measuring organization, as contemplated by the instant invention, for the purposes as noted above. Examples of the prior art include, U.S. Pat. No. 4,631,851 to Whitehurst formed with a fishing net arrangement and an elongate handle extending therefrom, where optionally a scale is imparted adjacent a free end of the handle for measuring purposes. The device is removed from a fishing pole arrangement, as presented by the instant invention, as a secondary and frequently unavailable tool utilized by fishermen.

U.S. Pat. No. 2,507,056 to Smith provides a scale device slidably mounted upon a paper hanger's brush for indication of a scale means utilized in various environments.

Similarly, U.S. Pat. No. 102,677 to Gregory sets forth a hammer formed with a scale mounted exteriorly thereof for use in a carpentry environment.

U.S. Pat. No. 3,522,657 to Metrulis sets forth a carpenter's level and a rule mounted thereon.

As may be appreciated, the use of measuring scales is available in various environments for particular purposes. To this end, it may be appreciated that there is a continuing need for a new and improved fishing rod and measuring apparatus which addresses both the problems of ease of use and effectiveness in construction, and in this respect, the present invention substantially fulfills this need.

SUMMARY OF THE INVENTION

In view of the foregoing disadvantages inherent in the known types of fishing rods now present in the prior art, the present invention provides a fishing rod and measuring device wherein the same utilizes a scale member in cooperation with a fishing rod for measuring of freshly caught fish thereby. As such, the general purpose of the present invention, which will be described subsequently in greater detail, is to provide a new and improved fishing rod and measuring device which has all the advantages of the prior art fishing rod arrangements and none of the disadvantages.

To attain this, the present invention includes a fishing rod and measuring device wherein the same includes a fishing pole formed with a handle and an aligned series of fishing line loops for measuring a fish therethrough. A scale mean is positionable diametrically opposed to the loops and incorporates a selectively mountable tape for positioning of the scale, as desired, in predetermined increments throughout the length of the rod, or optionally may include an abutment gauge utilizing a base adherably mounted to a fishing rod diametrically opposed to the loops including a slidable abutment member mounted within the gauge, wherein the abutment member may be of a telescoping nature to accommodate various heights of fish and conveniently determining their length.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar a they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing rod and measuring device which has all the advantages of the prior art fishing rods and none of the disadvantages.

It is another object of the present invention to provide a new and improved fishing rod and measuring device which may be easily and efficiently manufactured and marketed.

It is a further object of the present invention to provide a new and improved fishing rod and measuring device which is of a durable and reliable construction.

An even further object of the present invention is to provide a new and improved fishing rod and measuring device which is susceptible of a low cost of manufacture with regard to both materials and labor, and which accordingly is then susceptible of low prices of sale to the consuming public, thereby making such fishing rod and measuring devices economically available to the buying public.

Still yet another object of the present invention is to provide a new and improved fishing rod and measuring device which provides in the apparatuses and methods of the prior art some of the advantages thereof, while simultaneously overcoming some of the disadvantages normally associated therewith.

Still another object of the present invention is to provide a new and improved fishing rod and measuring device wherein the same provides for a convenient orientation of a scale member diametrically opposed to guide loops positioned on a fishing rod.

These together with other objects of the invention, along with the various features of novelty which characterize the invention, are pointed out with particularity in the claims understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an orthographic view of a further embodiment of the instant invention utilizing a sliding abutment member mounted diametrically opposed to the fishing rod guide loops.

FIG. 6 is an isometric illustration of the abutment gauge and guide bar adherably mounted to a fishing rod.

FIG. 9 is an isometric illustration of the gauge bar and sliding abutment member in association with a rearwardly mounted abutment member positioned at a remote terminal end of the handle.

DESCRIPTION OF THE PREFERRED EMBODIMENT

Figure 1:
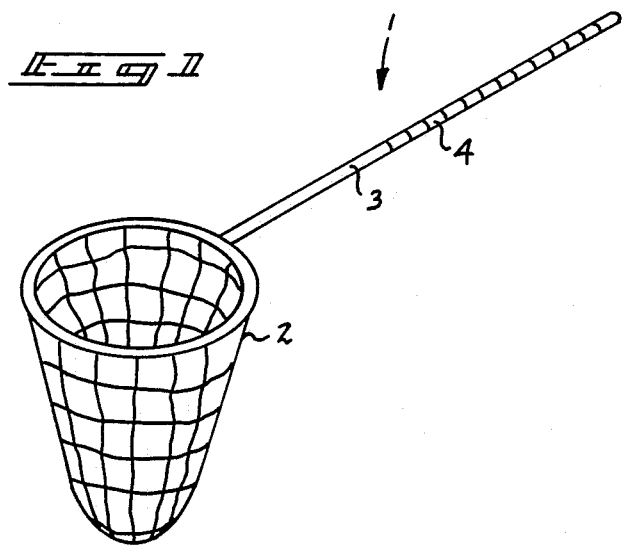
FIG. 1 is an isometric illustration of a prior art device.

With reference now to the drawings, and in particular to FIGS. 1 to 9 thereof, a new and improved fishing rod and measuring device embodying the principles and concepts of the present invention and generally designated by the reference numerals 10, 11, and 12 will be described.

Figure 2:
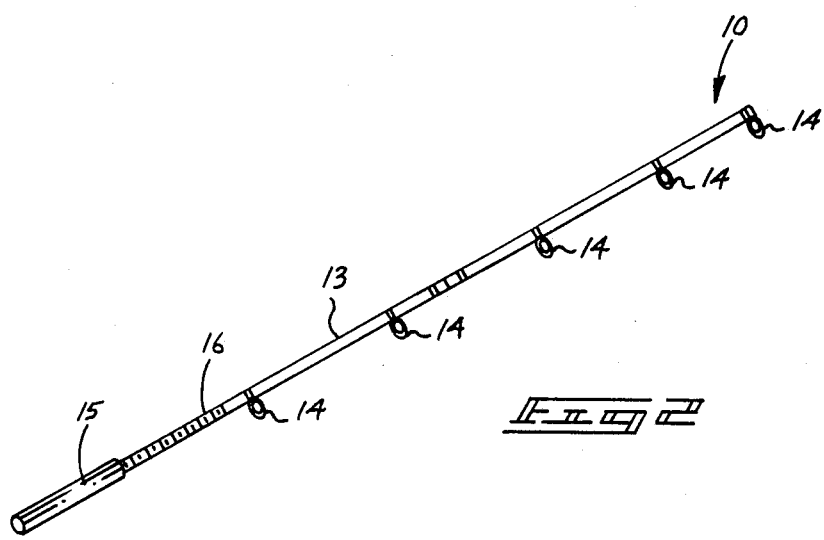
FIG. 2 is an isometric illustration of a conventional fishing rod incorporating the scale means of the instant invention.

More specifically, the fishing rod and measuring apparatus 10 essentially comprises a improvement over the prior art type fishing arrangements, as illustrated in FIG. 1, wherein a fishing net 1 includes an elongate net member 2 with an orthogonally and diametrically directed handle 3 formed with a scale 4 thereon. The fishing rod and measuring apparatus 10 includes an elongate fishing pole shaft 13 formed with a series of aligned fishing line guide loops 14 extending forwardly of an elongate handle 15, as illustrated in FIG. 2. A measuring scale 16 is mounted on the fishing pole shaft 13 diametrically opposed to the loops 14.

Figure 3:
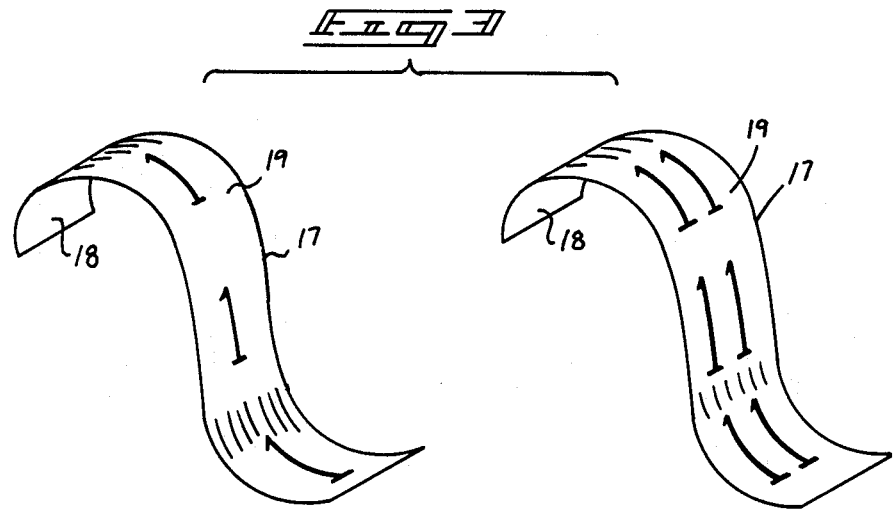
FIG. 3 is an isometric illustration of selectively adherable scale indicators for mounting in association with a fishing rod.
Figure 4:
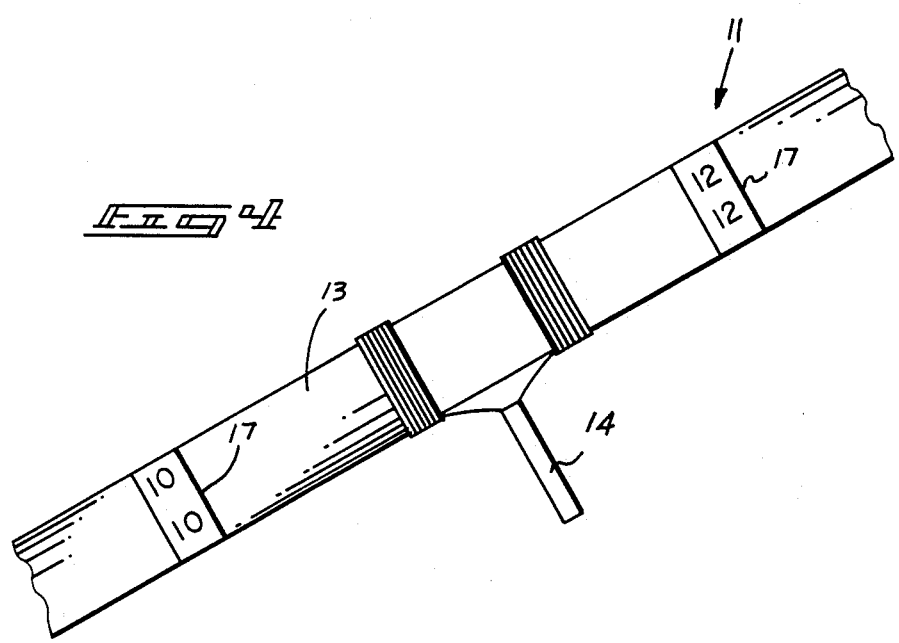
FIG. 4 is an orthographic view taken in elevation of the tape member, as illustrated in FIG. 3, in the association with a fishing rod.

FIG. 3 is illustrative of a modification of the instant invention wherein measuring tape members 17 of a predetermined length are formed with an adhesive bottom surface 18 and an indicator top surface 19 for securement along premeasured portions of the fishing pole shaft 13, as illustrated in FIG. 4 to define embodiment 11. The predetermined measurements are coincident with the indications of the measuring tapes 17, wherein the example illustrated in FIG. 4, a ten inch and twelve inch tape are positioned along the shaft. In this manner, the combination of the tape and fishing pole provides a convenient modification of existing poles for use as scale mounting means.

Figure 7:
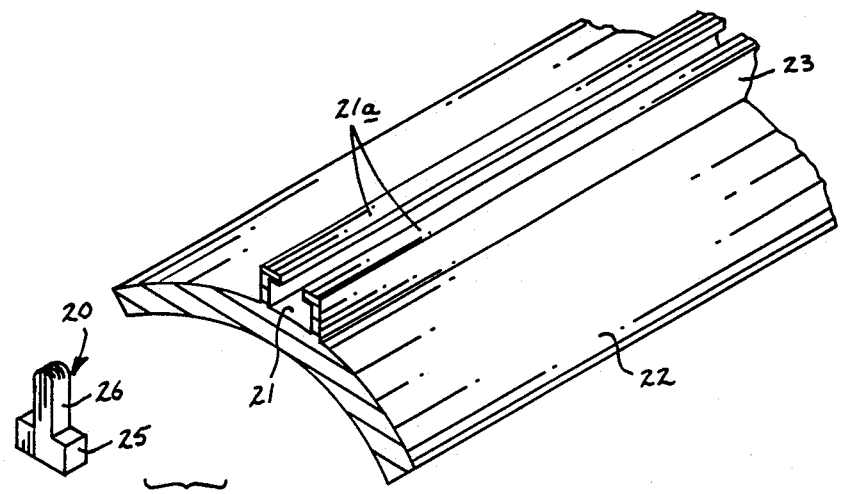
FIG. 7 is an isometric, detailed view of the gauge bar and sliding abutment member.
Figure 8:
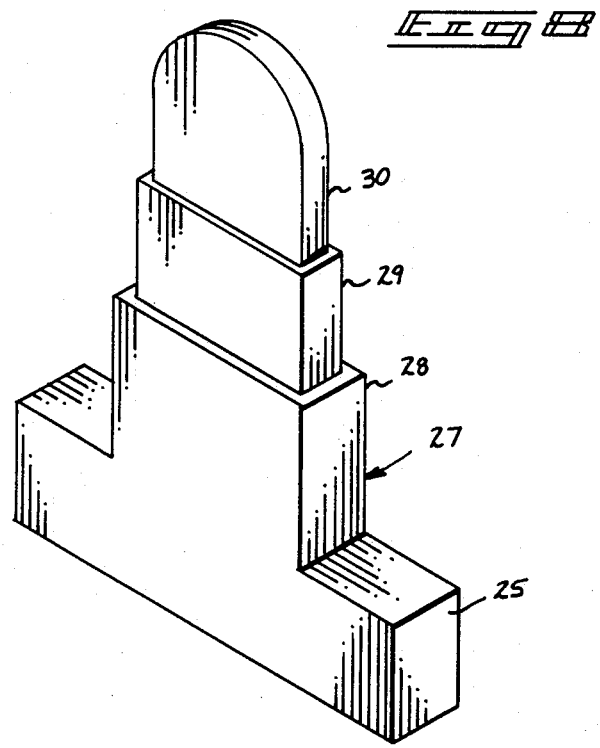
FIG. 8 is an isometric illustration of a telescoping version of the abutment member.

FIG. 5 is an illustration of a third embodiment 12 of the instant invention utilizing an elongate abutment gauge 20 that is slidably mounted within an elongate "T" shaped slot 21 of a gauge bar 22 formed with a central, elongate boss member 23. The "T" slot 21 is formed with inwardly directed flanges 21a wherein the rectangular base 25 of the abutment gauge 20 is of a complementary cross-sectional configuration to that defined by the portion of the slot 21 confined between the flanges 21a with the upwardly projecting abutment 26 of a predetermined width equal to that defined by the spacing between the inwardly directed flanges 21a, as illustrated in FIG. 7 for example.

FIG. B illustrates a modified abutment member 27 formed with a respective first upwardly projecting abutment member 28 telescopingly receiving a second upwardly projecting abutment member 29 that in turn telescopingly receives a third upwardly projecting abutment member 30. The telescoping abutment members permit the measuring of various fish that may have a mouth portion at various spacing relative to a side body portion and thereby accommodate various and peculiarly shaped fish.

FIG. 9 is illustrative of the third embodiment 12 utilizing and incorporating a second abutment gauge 27 mounted and aligned with the first abutment gauge and integrally positioned to a remote free end of the handle 15, wherein both abutment gauges and the abutment gauge bar 22 and its associated scale indicator portions 24 mounted thereon are diametrically opposed to the positioning of the guide loops 14 of the fishing rod 13.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fishing rod and measuring apparatus comprising, in combination,
    an elongate fishing rod including a pole member with an enlarged handle mounted on a first end of the pole member and a series of aligned fishing line guide loops mounted on the pole member spaced from the handle and extending to the other end of the pole member, and measuring means mounted along a predetermined length of the pole member, and wherein the measuring means is mounted on the pole member diametrically opposed to the aligned guide loops, and wherein the measuring means includes a slidable abutment member in sliding association with a gauge bar, the gauge bar including a base portion and a raised boss portion, the boss portion including a slot for receiving an abutment gauge slidably therewithin, and wherein the abutment gauge includes a base portion and a first member telescopingly receiving a second and third member, the second member telescopingly receiving a third member, the first, second, and third members each orthogonally aligned relative to the elongate slot.

2. A fishing rod and measuring apparatus as set forth in claim 1 further including a further abutment gauge aligned with the abutment gauge, said further abutment gauge mounted on a free terminal end of the handle remote from the pole.

3. A fishing rod and measuring apparatus as set forth in claim 2 wherein the slot comprises a first sot formed with a rectangular configuration of complementary configuration that is defined by the base of the abutment gauge, and the slot further including a plurality of opposed flanges, the flanges spaced a predetermined width equal to a spacing of the first member of the abutment gauge.

* * * * *